US009351604B2

(12) United States Patent
Talon et al.

(10) Patent No.: US 9,351,604 B2
(45) Date of Patent: May 31, 2016

(54) BEVERAGE PREPARATION MACHINE (75) Inventors: Christian Talon, Vufflens-le-Chateau (CH); Samuel Odet, Vevey (CH)

(73) Assignee: Nestec S.A., Vevey (CH)

( * ) Notice: Subject to any disclaimer, the term of this patent is extended or adjusted under 35 U.S.C. 154(b) by 348 days.

(21) Appl. No.: 14/344,804

(22) PCT Filed: Sep. 5, 2012

(86) PCT No.: PCT/EP2012/067262
§ 371 (c)(1),
(2), (4) Date: Mar. 13, 2014

(87) PCT Pub. No.: WO2013/037678
PCT Pub. Date: Mar. 21, 2013

(65) Prior Publication Data
US 2014/0345468 A1     Nov. 27, 2014

(30) Foreign Application Priority Data

Sep. 16, 2011  (EP) .................................... 11181532

(51) Int. Cl.
*A47J 31/00* (2006.01)
*A47J 31/44* (2006.01)
(Continued)

(52) U.S. Cl.
CPC .......... *A47J 31/4492* (2013.01); *A47J 31/3676* (2013.01); *A47J 31/407* (2013.01); *A47J 31/4403* (2013.01); *A47J 31/4425* (2013.01); *A47J 31/4428* (2013.01);
(Continued)

(58) Field of Classification Search
CPC ................. B67D 1/002; B67D 1/0026; B67D 2001/0811; B67D 1/1227; B67D 1/211; B67D 1/1236; B67D 1/124; B67D 1/16; B67D 1/165; B67D 3/009; B67D 3/008; B67D 3/0087; A47J 31/3676; A47J 31/3623; A47J 31/4425; A47J 31/4428; A47J 31/4482; A47J 31/4492
USPC ............. 99/279, 295, 323.3; 222/71, 77, 108, 222/168, 168.5, 169
See application file for complete search history.

(56) References Cited

U.S. PATENT DOCUMENTS 756,428 A *  4/1904  Strasburger ............. A61J 3/002
                                                        141/105
2,115,335 A *  4/1938  Keck ....................... B65B 3/323
                                                        141/146
(Continued)

FOREIGN PATENT DOCUMENTS

DE     2048163     4/1972
EP     1731065    12/2006
EP     1878368     1/2008

*Primary Examiner* — Reginald L Alexander
(74) *Attorney, Agent, or Firm* — K&L Gates LLP (57) ABSTRACT The present invention relates to a beverage preparation machine (1) for use with a beverage preparation capsule, comprising a machine main unit with a casing (3), a water reservoir (4), and a brewing head (5) comprising a dispensing outlet for dispensing said beverage into a container (12) placed below said outlet, characterized in that said machine further comprises a base element (2) supporting the main unit (3, 4, 5), and (i) the base element (2) comprises supporting stands with surfaces (11) for supporting said container (12), said stands having different heights, and (ii) the machine main unit (3, 4, 5) is pivotally mounted onto said base element (2) such that the brewing head (5) can be aligned above any of the supporting surfaces (11) by rotation of said machine main unit.

8 Claims, 6 Drawing Sheets (51) Int. Cl.
*A47J 31/36* (2006.01)
*B65D 1/16* (2006.01)
*B67D 3/00* (2006.01)
*B67D 1/00* (2006.01)
*B67D 1/12* (2006.01)
*A47J 31/40* (2006.01)

(52) U.S. Cl.
CPC .............. *A47J 31/4482* (2013.01); *B65D 1/16* (2013.01); *B67D 1/002* (2013.01); *B67D 1/1236* (2013.01); *B67D 3/008* (2013.01); *B67D 3/009* (2013.01)

(56) References Cited

U.S. PATENT DOCUMENTS

| | | | | |
|---|---|---|---|---|
| 2,649,997 | A * | 8/1953 | Klenk | B67D 3/00 222/108 |
| 5,967,371 | A * | 10/1999 | Stephen | B67D 1/0875 141/88 |
| 7,470,364 | B2 * | 12/2008 | Oranski | B67D 1/001 210/198.1 |
| 8,640,748 | B2 * | 2/2014 | Chera | B67D 3/0009 141/234 |

* cited by examiner

BEVERAGE PREPARATION MACHINE

CROSS REFERENCE TO RELATED APPLICATIONS

The present application is a National Stage of International Application No. PCT/EP2012/067262, filed on Sep. 5, 2012, which claims priority to European Patent Application No. 11181532.0, filed Sep. 16, 2011, the entire contents of which are being incorporated herein by reference.

FIELD OF THE INVENTION

The present invention concerns a beverage preparation machine, particularly a machine for in-home consumption, that can adapt the beverage volume dispensed in cup, depending on the cup size.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working a rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 6 bar for dissolution products, 2 to 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting, infusing, and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent n° EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
  a hollow body and an injection wall which is impermeable to liquids and to air and which is attached to the body and adapted to be punctured by e.g. an injection needle of the machine,
  a chamber containing a bed of roast and ground coffee to be extracted,
  an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
  optionally, means configured to break the jet of fluid so as to reduce the speed of the jet of fluid injected into the capsule and distribute the fluid across the bed of substance at a reduced speed.

Beverage preparation machines and capsules as described above, for many of them, are designed to give the consumer the choice of preparing the beverage he likes amongst a whole range of beverage products.

In the range of beverages that is proposed to the consumer, some correspond to large cups typically having a volume of 200 ml or above, for instance Caffee Crema Grande, latte macchiatos, cappuccinos, chococinos, American brew-like coffees, or the like. Some other beverages correspond to mid-size cups typically between 100 and 200 ml, like for instance teas, herbal infusions, Chai tea, tea latte, or chocolate-based preparations such as Nesquik®. Finally, some correspond to small serving size, typically below 100 ml, such as for instance espressos, ristretto, or cortado coffee.

Some prior art beverage preparation systems are further described for instance in Applicant's EP 1878368 A1. In this document, the beverage production machine comprises:
  a functional block including a beverage extraction module and a beverage delivery outlet, and
  a support base on which the functional block is arranged and which is designed to supply the functional block electrically, wherein at least the beverage delivery outlet is mounted free in rotation around a vertical axis relative to the support base.

Another prior publication of the applicant is EP 1731065 A1 which discloses a beverage machine comprising a drip tray device that can accommodate recipients of different heights. The drip tray device is formed of a collect tank and has a first drip support grid removably mounted on the tank for holding short recipients and has a second drip support for longer recipients such as a glass. The whole device is removable for ease of emptying and rinsing. In a possible mode, the first removable grid is provided with a gutter to evacuate liquid in a main collect reservoir.

Another prior publication is DE 20 48 163 A1 to Wuerttenbergische Metallwarenfabrick, which discloses The beverage machine is provided with a dosing valve which is electrically controlled by a selector switch which in turn is controlled by a sensing mechanism which is influenced by at least one feature of the receptacle which is to be filled with the beverage. Through this sensing mechanism the control of the selector switch automatically follows in dependence on each capacity of the receptacle so that no errors regarding overfilling or under filling can occur. The sensing mechanism can operate according to the shape e.g. height or weight of the receptacle. The sensing mechanism preferably has at least one sensing element movably mounted above the stand for the receptacle so that it is compressed when a larger receptacle.

The beverage preparation machines disclosed in the above cited prior publications are either rather basic (although they offer a few consumer-friendly features, like the possibility to rotate the machine across a stand, or the possibility to adjust the height of the cup tray), or alternatively very complex when aiming at offering more complex features and consumer benefits.

A constant issue with known machines is that the distance between the cup tray (or drip tray) and the beverage dispensing outlet of the extraction head is often not adapted to the cup size that is chosen by the consumer. Particularly, this distance is often too large. As a result, beverage liquid may splash during dispensing, which is of course undesirable.

Moreover, most machines on the market do not adapt the volume of dispensed liquid, depending on the type of beverage that was selected, so that the consumer has to manually adapt the volume, without knowing exactly what is appropriate.

As a result, the consumer may over-dilute the beverage, or on the contrary, she/he may stop the dispensing operation too early, such that the beverage will be too concentrated in cup.

In order to solve the splashing issue, most machines are equipped with a cup/drip tray that is adjustable in height. Height position of the tray may be continuous, or be a step-by-step mechanism. In all known systems, handling and setting of the cup tray is uneasy, and certainly, user-friendliness of such systems can be improved.

In order to solve the dispensing volume issue, known machines have been developed with semi-automated or automated adaptation of in-cup volume depending on the beverage type.

In some simple semi-automated systems, like in Nespresso® machines, at least two push buttons are placed on the machine, each button corresponding to a volume, e.g. one button for short cups, and the other for long cups. In some instances, the volume associated to each button can be programmed. However, in such systems, the volume associated to each push button is fixed, be it set in the factory or manually programmed by the consumer. The variety of possible dispensing volumes is limited in such systems, and re-programming the volume for each button is fastidious. In such systems, the splashing issue described above is not solved.

In some other semi-automated systems like Nescafé Dolce Gusto® Creativa® systems, the machine comprises an in-built computer program that is linked to a control panel and display. Using the control panel and display, the consumer chooses the name of the beverage into the machine, which corresponds to the type of beverage capsule she/he will insert into the machine. The machine then adapts automatically some preparation parameters like water temperature or dispensing volume. In such systems, the splashing issue described above is not solved.

Finally, in some other, more complex but fully automated systems, the machine comprises a capsule-recognition device, so that the machine automatically detects which type of beverage capsule is inserted therein, and the machine automatically adapts its preparation parameters. However, such systems require sensors and program in the machine to detect and read which type of capsule is inserted, which make such machines expensive. Additionally, the detection of capsules requires a specific marking—e.g. colour, magnetic, RFID chip, barcode, or similar—which adds to the cost. At the same type, such systems do not adapt the cup tray position, hence do not solve the splashing issue.

There is therefore a need for a beverage preparation system that obviates the drawbacks mentioned above, and is inexpensive, user-friendly, allows to adapt the cup position relative to the dispensing outlet of the machine, and allows the machine to automatically adapt some of the preparation parameters and at least the in-cup beverage volume that is dispensed.

SUMMARY OF THE INVENTION

The need mentioned above is met with the present invention, with a beverage preparation machine for use with a beverage preparation capsule, comprising a machine main unit with a casing, a water reservoir, and a brewing head comprising a dispensing outlet for dispensing said beverage into a container placed below said outlet, characterized in that said machine further comprises a base element supporting the main unit, and (i) the base element comprises supporting stands with surfaces for supporting said container, said stands having different heights, and (ii) the machine main unit is pivotally mounted onto said base element such that the brewing head can be aligned above any of the supporting surfaces by rotation of said machine main unit.

The different positions of the dispensing head correspond to different containers being positioned hereunder, each container type being adapted for a specific beverage volume dispensed thereinto. As can be now understood, the invention allows a consumer to align the brewing head by rotation of the machine main unit around the base element, according to the container (i.e. cup) size she/he has chosen, such that the distance between the cup mouth and the dispensing outlet is minimal to avoid splashing.

One of the supporting surfaces can be positioned at the same height as the base element lowest surface.

In a highly preferred embodiment of the invention, the base comprises coding means associated with each of said supporting surface of the base element, said coding means being associated with a machine processor and a flow meter for setting a beverage dispensing volume value that depends on the cup-supporting surface that is loaded with a cup.

In such a configuration, the machine processor is advantageously suitable for setting at least one other beverage preparation parameter selected within the list of: dispensed beverage temperature, beverage preparation pressure, beverage preparation time, cleaning of the machine dispensing head, or a combination thereof.

Preferably, said coding means comprise weight sensors for detecting the presence of a cup thereonto.

Also in a preferred embodiment of the invention, the machine further comprises cooperating sensing means located respectively on the base element and on the casing, said sensing means being associated with a machine processor and a flow meter for setting a beverage dispensing volume value that depends on the position of the brewing head relative to a given cup-supporting surface.

Said sensing means are respectively selected within the list of:
coloured surfaces and colour sensors or CCD readers,
barcodes and barcode readers,
recessed or protruding elements and mechanical switches or tactile sensors,
RFID chips and RFID sensors,
magnetic surfaces and magnetic sensors,
printed characters and CCD camera,
or a combination thereof.

With such a system, the machine automatically sets its beverage preparation parameters, particularly the volume that is dispensed, according to the rotational position of the machine across the base element, i.e. according to the alignment of the dispensing outlet in front of one or the other of the supporting surfaces. For instance, if the machine is turned and positioned so that the dispensing outlet is aligned with the highest supporting surface of the base, which corresponds to very small cups for espressos or ristrettos, the machine will automatically set to small volumes, not exceeding what can be filled into small cups.

In a preferred embodiment of the invention, the supporting stands and surfaces are built-in with the base element.

Advantageously, each supporting surface can comprise a drip tray, composed of a recess for recuperating drips falling from the container or from the dispensing outlet of the machine, recess onto which is positioned a liquid permeable support for supporting the container.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
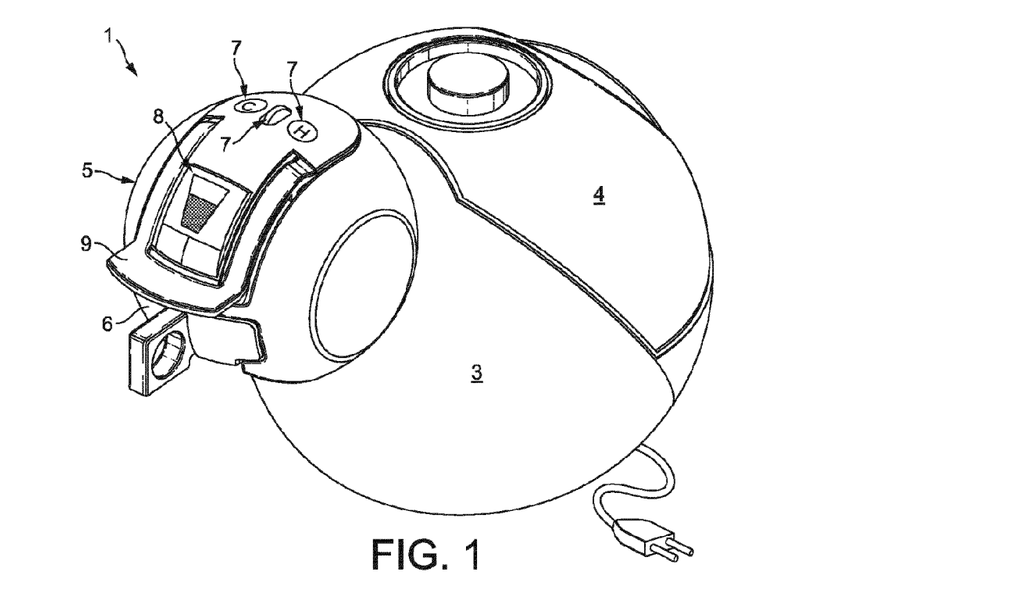
FIG. 1 is a schematic perspective view of a beverage preparation machine without its base element.

The beverage preparation machine 1 according to the present invention comprises a machine main unit as illustrated in FIG. 1, which is supported by a base element 2—not illustrated in FIG. 1—onto which it is mounted in a rotational manner.

The machine main unit comprises a machine body with a casing 3 enclosing the various functional parts of the machine such as a liquid pump, a heating element for optionally heating the liquid that will eventually be injected into a beverage preparation capsule inserted inside the machine.

The machine also comprises a water reservoir 4 which is removable from the casing to be refilled, and is connectable to the casing in a fluid-communication manner.

The machine also comprises a brewing head 5 having a capsule holder 6 for holding a capsule, said capsule holder being removably inserted into the brewing head 5.

The brewing head 5 further comprises a control panel with control buttons 7 for the user to select such beverage preparation parameters as the temperature of the beverage or the volume. The brewing head can also comprise a screen 8 to show the progress of the beverage preparation, and also display the beverage preparation parameters set by the user, such as the desired in-cup volume for instance, as illustrated in FIG. 1.

The brewing head 5 also comprises a lever 9, which the user lifts in order to unlock the capsule holder inside the machine. The lever is linked to a liquid injection element such as a needle which is located inside the brewing head, and which pierces through the capsule top membrane when said lever is pressed down. The press down movement locks the capsule holder and capsule into the brewing head at the same time.

Figure 2A:
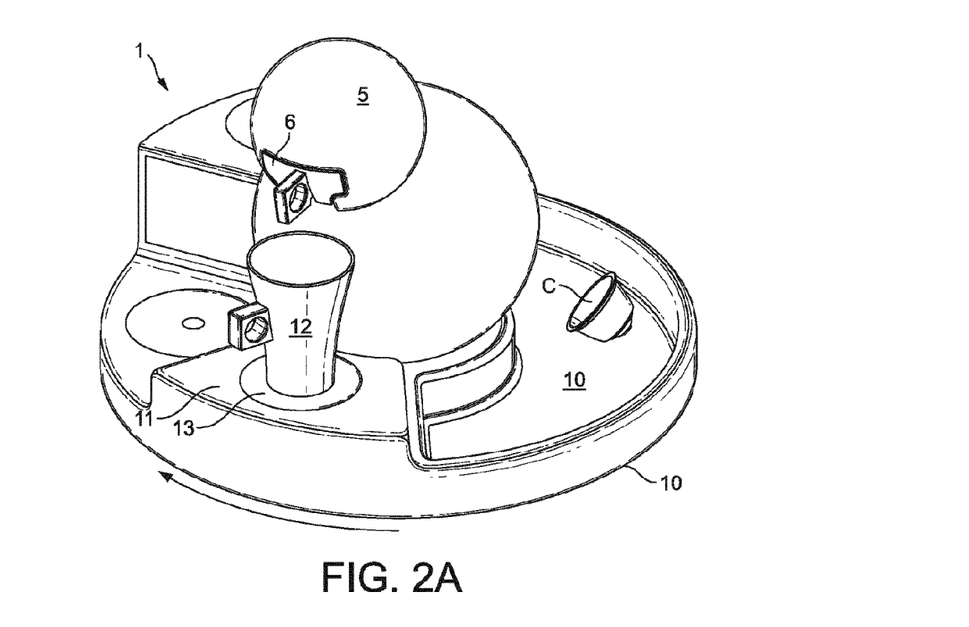
FIGS. 2A, 2B, 2C are schematic perspective views of a beverage preparation machine, in different rotational positions.
Figure 2B:
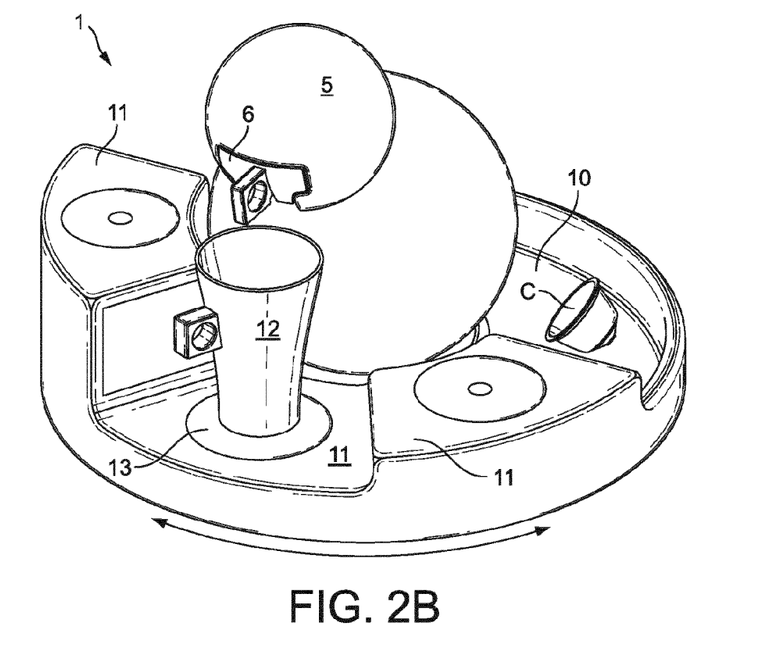
Figure 2C:
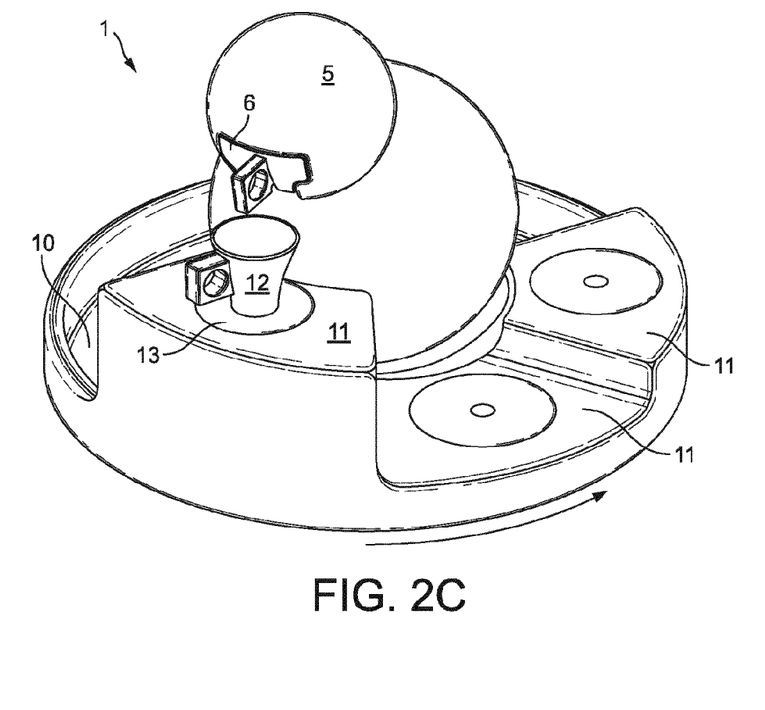

The machine 1 according to the invention with its support base element 2 is represented in FIGS. 2A, 2B and 2C. As illustrated in these figures, the machine main unit is rotationally positioned onto the base element 2. The latter comprises a base plate 10, a portion of which can be used to store various items, such as cups of capsules ("C"). The base element 2 further comprises a plurality of cup-supporting stands with cup-supporting surfaces 11, said stands having different heights.

FIG. 2A represents the machine main unit positioned such that the brewing head 5 is aligned with the cup-supporting surface 11 suitable for supporting a medium-size cup 12. FIG. 2B represents the machine main unit positioned such that the brewing head 5 is aligned with the cup-supporting surface 11 suitable for supporting a large-size cup 12. FIG. 2C represents the machine main unit positioned such that the brewing head 5 is aligned with the cup-supporting surface 11 suitable for supporting a small-size cup 12.

In each configuration, the position of the machine main unit relative the base element 2 is detected by the machine control chip which adjusts the volume to be dispensed in the cup automatically (the user can then adjust this volume by using the control panel). The dispensed volume is chosen automatically in accordance with the cup volume in front of which the brewing head of the machine is positioned.

To that effect, the base element 2 comprises coding means associated with each of said supporting surfaces 11, said machine comprising sensing means for sensing said coding means, said sensing means being associated with a machine processor and a flow meter for setting a beverage dispensing volume value that depends on the rotational position of the machine on the base.

In the case of FIG. 2A, the coding means associated to the cup-supporting plate in front of which the brewing head is positioned, comprises a cup detector plate 13.

Figure 3A:
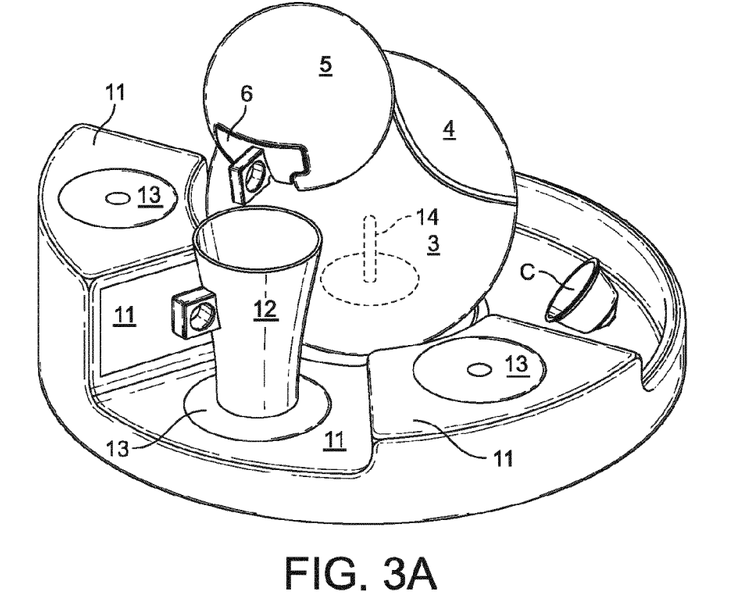
FIGS. 3A and 3B are respectively perspective and profile schematic views of a beverage preparation machine of the invention, configured in a rotational position which allows dispensing of a large cup.
Figure 3B:
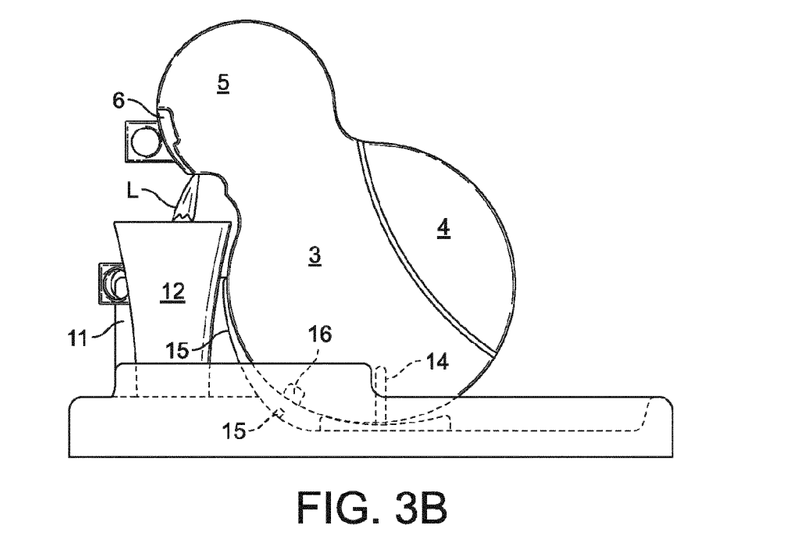

FIGS. 3A and 3B show the machine according to the invention wherein the main unit is positioned such that the brewing head faces the cup supporting surface adapted for a large cup size. The rotation of the machine main unit can be performed around a rotational axis 14 that links the bottom part of the machine casing 3 and the centre of the base plate 10. Such an axis 14 guarantees that the vertical position of the machine main unit is the same, whatever its rotational position. This ensures that the horizontal position of the brewing head 5 (i.e. its trim), relative to the cup-supporting surfaces does not vary when the main unit of the machine is rotated.

As a cup 12 is positioned onto the supporting surface, the presence of said cup is detected by the weight-sensitive sensor of the cup-detector plate 13. Moreover, the exact rotational position of the brewing head relative to the cup-supporting surfaces 11 is detected automatically, by sensing means disposed between the machine main unit and the base element 2.

Such sensing means can be mechanical switches 15 disposed on the base element 12, each switch 15 being positioned at the internal surface of a corresponding supporting surface element 11. Alternatively and preferably, each switch 15 is a proximity sensor that senses a corresponding sensor 16 of the machine casing, as illustrated in FIG. 3B. When the casing sensor faces the corresponding sensor located in the base element, a connection is established and the machine control board automatically sets the volume to be dispensed according to the size of the cup that is to be placed onto the corresponding supporting surface. In the example illustrated in FIGS. 3A and 3B, the machine sets the volume to about 250 ml which corresponds to a large-size cup.

Figure 4A:
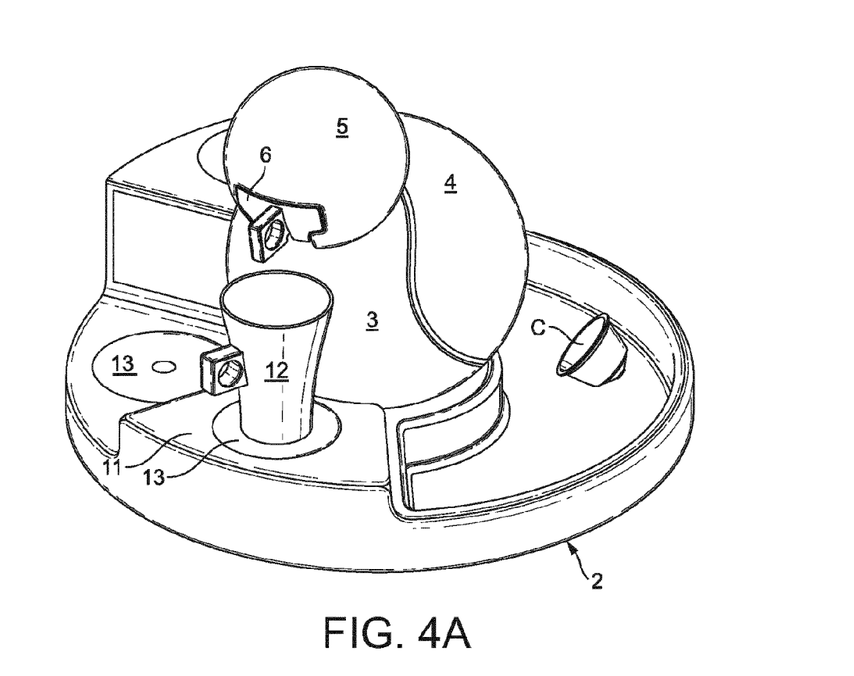
FIGS. 4A and 4B are respectively perspective and profile schematic views of a beverage preparation machine of the invention, configured in a rotational position which allows dispensing of a medium cup.
Figure 4B:
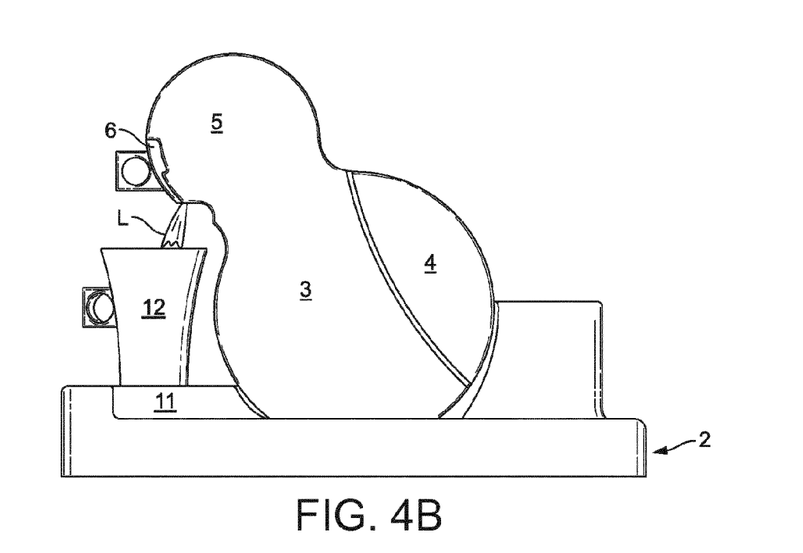

FIGS. 4A and 4B illustrate the same machine wherein the machine main unit is rotated, such that the brewing head faces the mid-size cup-supporting surface. In that configuration, the volume to be dispensed is automatically set by the machine at about 100 ml, which corresponds to a mid-size cup. In case a cup is not properly placed onto the cup-supporting surface, and if the cup-detector plate 13 does not detect the presence of a cup, the volume will not start a brewing cycle. In that case, a message will be displayed on the machine display screen to advise the user to place a cup properly on the cup-supporting surface.

Alternatively, the cup supporting surface can be retro-illuminated: if the cup is not present or if said cup is not properly positioned on the cup-supporting surface 11, the latter will blink and be illuminated with a red colour. Once the user has placed a cup in the right position, i.e. centered across the cup-supporting surface that corresponds to the position of the brewing head, then said cup-supporting surface will be illuminated green and stops blinking.

Figure 5A:
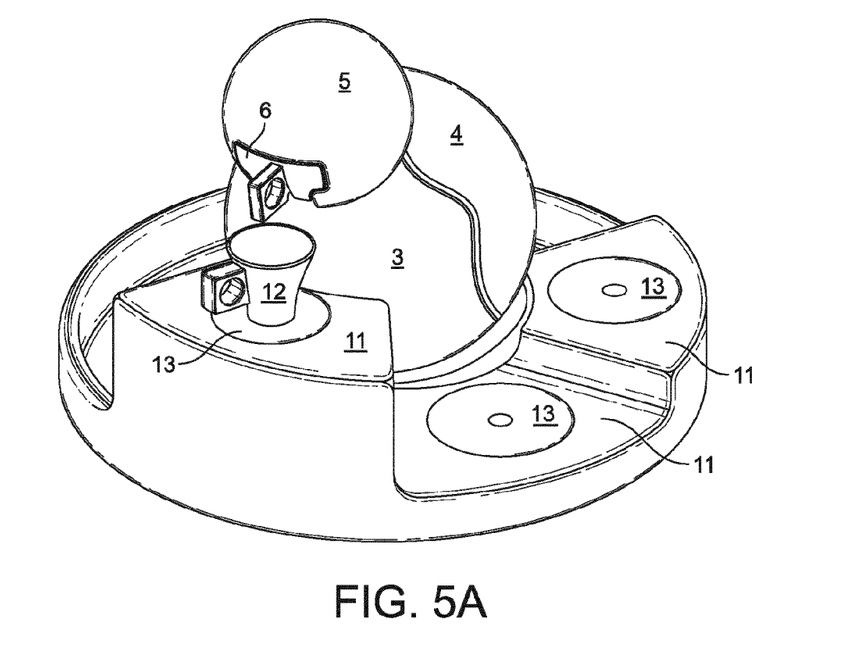
FIGS. 5A and 5B are respectively perspective and profile schematic views of a beverage preparation machine of the invention, configured in a rotational position which allows dispensing of a small or espresso cup.
Figure 5B:
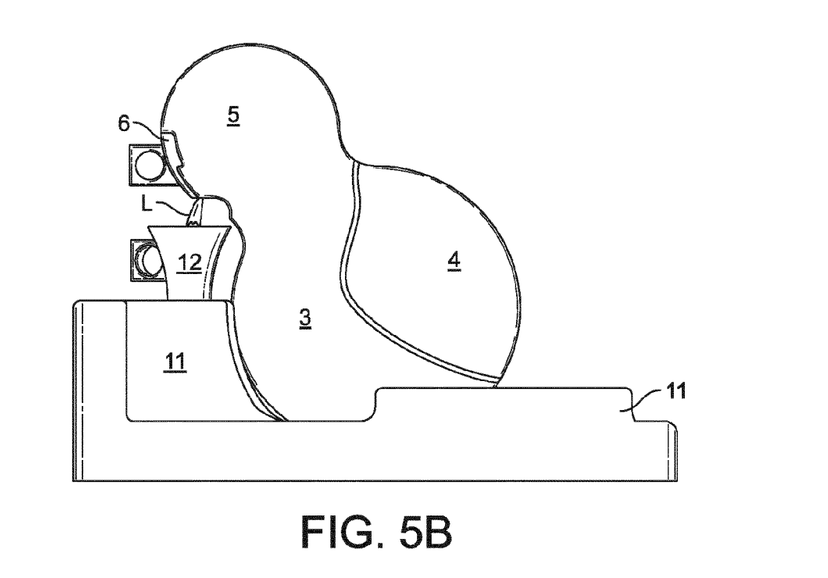

FIGS. 5A and 5B illustrate the same machine wherein the machine main unit is rotated, such that the brewing head faces the small-size cup-supporting surface. This configuration typically corresponds to the preparation of espressos and ristrettos, that is to say, where the cup volume does not exceed 50 ml.

As it can be seen in the FIGS. 3B, 4B, 5B, the brewing head is positioned above a cup such that the jet of liquid "L" that is dispensed falls correctly into the cup, whatever the cup size, and whatever the rotational position of the brewing head 5 relative to the base element 2. The distance between the dispensing outlet of the machine and the top edge of the cup is reduced, so that splashing of product outside the cup is minimized, whatever the cup and serving size.

The rotation of the machine main unit onto the machine base element 2 can be performed manually by the user. However, it can also be automated. In that case, a drive motor is included into the machine casing which is links the casing 3 to the base plate 10 around the axis 14 illustrated in FIGS. 3A and 3B for instance. In that case, the drive motor operation is triggered and managed by the control board of the machine, which is linked to the cup-detector plates, such that when a cup is detected by one of the cup-detector plates, the drive motor automatically rotates the machine such that the brewing head is aligned with the cup-supporting surface which is loaded with a cup. The machine is therefore ready for use. In such a configuration, the machine also sets a dispensing volume which corresponds to the cup size as explained above.

Figure 6A:
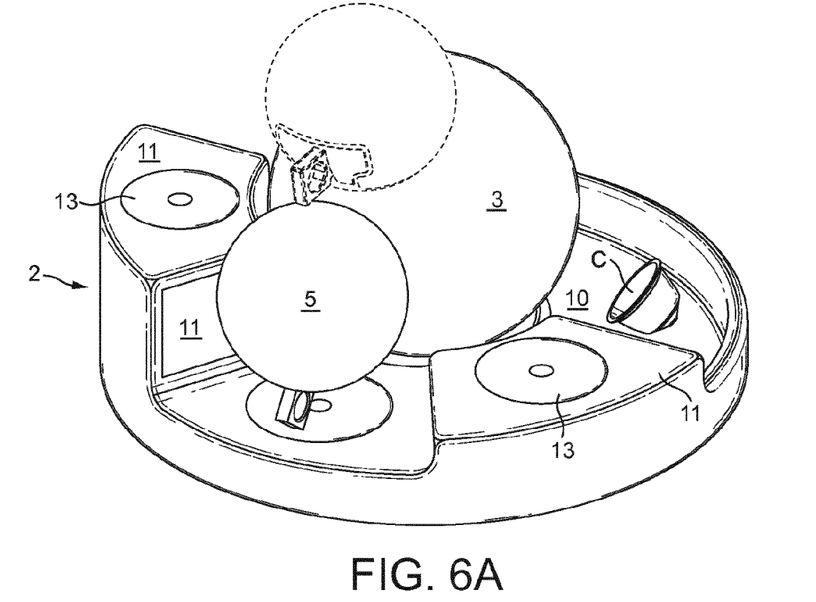
FIGS. 6A and 6B are respectively perspective and profile schematic views of a beverage preparation machine of the invention, configured in its compacted/storing configuration.
Figure 6B:
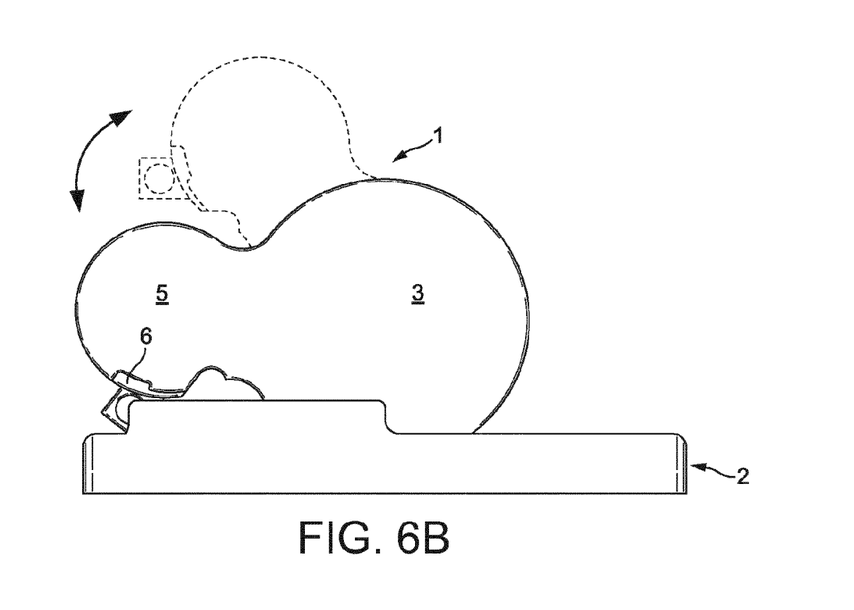

Now turning to FIGS. 6A and 6B, it can be seen that the machine can be compacted for storage, or for packing.

As shown in FIGS. 6A and 6B, in the functional configuration of the machine, the machine main unit—i.e. casing, brewing head and reservoir—stands upright such that the brewing head 5 is positioned above the casing 3, as illustrated in dotted lines.

The machine main unit can however be tilted to lower down the brewing head as illustrated in solid lines in FIGS. 6A and 6B. In that position, the brewing head 5 is positioned above the casing 3, as it can be seen especially in solid lines in FIG. 6B.

In case the main unit of the machine is mounted relative to the base element 2 of the machine, around an axis, as described above with reference to FIGS. 3A and 3B, said axis can comprise a pivot hinge to allow the user to tilt the main unit into one or the other of the two configurations showed in FIGS. 6A and 6B.

In the tilted configuration, the beverage preparation machine as a whole occupies a smaller volume, and is therefore easier to store or transport.

A beverage preparation machine according to the present invention is suitable for use with any type of beverage preparation capsules, and particularly, it can be used for the preparation of coffee, tea, chocolate-based beverages, dairy-based beverages, soups, herbal preparations, or a combination thereof. It can also be used as well to prepare infant nutrition products.

The invention claimed is:

1. A beverage preparation machine for use with a beverage preparation capsule, comprising a machine main unit with a casing, a water reservoir, and a brewing head comprising a dispensing outlet for dispensing the beverage into a container placed below the outlet, the machine further comprises a base element supporting the main unit, and the base element comprises supporting stands with surfaces for supporting the container, the stands having different heights; and the machine main unit is pivotally mounted onto the base element such that the brewing head can be aligned above any of the supporting surfaces by rotation of the machine main unit.

2. A beverage preparation machine according to claim 1, wherein the base comprises a coding member associated with each of the supporting surface of the base element, the coding member being associated with a machine processor and a flow meter for setting a beverage dispensing volume value that depends on the cup-supporting surface that is loaded with a cup.

3. A beverage preparation machine according to claim 2, wherein the machine processor is suitable for setting at least one other beverage preparation parameter selected from the list consisting of: dispensed beverage temperature, beverage preparation pressure, beverage preparation time, cleaning of the machine dispensing head, and a combination thereof.

4. A beverage preparation machine according to claim 2, wherein the coding member comprise weight sensors.

5. A beverage preparation machine according to claim 1, wherein the machine further comprises a cooperating sensor located respectively on the base element and on the casing, the sensor being associated with a machine processor and a flow meter for setting a beverage dispensing volume value that depends on the position of the brewing head relative to a given cup-supporting surface.

6. A beverage preparation machine according to claim 5, wherein the sensors are respectively selected from the group consisting of:
- colored surfaces and color sensors or CCD readers,
- barcodes and barcode readers,
- recessed or protruding elements and mechanical switches or tactile sensors,
- RFID chips and RFID sensors,
- magnetic surfaces and magnetic sensors,
- printed characters and CCD camera, and
- combinations thereof.

7. A beverage preparation machine according to claim 1, wherein supporting stands and surfaces are built-in with the base element.

8. A beverage preparation machine according to claim 1, wherein each supporting surface comprises a drip tray.

* * * * *